United States Patent [19]
Saiki et al.

[11] Patent Number: 5,599,489
[45] Date of Patent: Feb. 4, 1997

[54] PREPARING MOLDED ARTICLES OF FLUORINE-CONTAINING POLYMER WITH INCREASED WATER-REPELLENCY

[75] Inventors: Yukinori Saiki, Chiba; Mina Ichikawa, Yachiyo; Massatsu Shimomura, Tokyo; Masahiro Ono, Kawaguchi; Nobuatsu Watanabe, Nagaokakyo, all of Japan

[73] Assignees: Onoda Cement Co., Ltd., Onoda; ASK Corporation, Yokohama, both of Japan

[21] Appl. No.: 450,990

[22] Filed: May 25, 1995

Related U.S. Application Data

[63] Continuation of Ser. No. 181,098, Jan. 13, 1994, abandoned.

[30] Foreign Application Priority Data

| Jan. 18, 1993 | [JP] | Japan | 5-005926 |
| Jun. 30, 1993 | [JP] | Japan | 5-162017 |
| Nov. 19, 1993 | [JP] | Japan | 5-290718 |

[51] Int. Cl.⁶ .............. B29C 59/02; B29C 71/02
[52] U.S. Cl. .............. 264/83; 264/127; 264/162
[58] Field of Search .............. 264/83, 162, 483, 264/127

[56] References Cited

U.S. PATENT DOCUMENTS

| 3,313,642 | 4/1967 | Waugh | 264/162 |
| 3,354,022 | 11/1967 | Dettre et al. | 264/284 |
| 4,247,580 | 1/1981 | Chao | 264/83 |
| 4,548,867 | 10/1985 | Ueno et al. | 264/83 |
| 4,568,573 | 2/1986 | Sunada et al. | |
| 4,623,505 | 11/1986 | Traut | 264/162 |
| 4,666,762 | 5/1987 | Yamamoto | |
| 4,701,290 | 10/1987 | Eschwey et al. | 264/83 |
| 4,764,405 | 8/1988 | Bauman et al. | 264/83 |
| 5,041,304 | 8/1991 | Kusano et al. | |

FOREIGN PATENT DOCUMENTS

| 48-13712 | 4/1973 | Japan | 264/483 |
| 4-309532 | 11/1992 | Japan | 264/83 |

OTHER PUBLICATIONS

Loh et al. (1987) Polym. Eng. Sci 27(11), 861–8.

*Primary Examiner*—Jeffery R. Thurlow
*Attorney, Agent, or Firm*—Oblon, Spivak, McClelland, Maier & Neustadt, P.C.

[57] ABSTRACT

A molded article of fluorine-containing polymer, especially of polytetrafluoroethylene, with increased water-repellency, and a jig for holding articles to be washed during washing processes using an aqueous washing medium. The molded article with superior water-repellency can be obtained by a treatment of the surface of fluorine-containing polymer with a fluorine-containing gas after roughening of the surface. The water-repellent jig made of the surface treated polytetrafluoroethylene is suited for use as a carrier for washing semi-conductor wafers and glass plates or guide rolls of a liquid crystal display device.

4 Claims, 5 Drawing Sheets

PREPARING MOLDED ARTICLES OF FLUORINE-CONTAINING POLYMER WITH INCREASED WATER-REPELLENCY

This application is a Continuation of application Ser. No. 08/181,098, filed on Jan. 13, 1994, now abandoned.

BACKGROUND OF THE INVENTION

1. Field of the Invention

The present invention relates to a molded article of fluorine-containing polymer, especially of polytetrafluoroethylene, with increased water-repellency, and to a jig for holding articles to be washed during washing processes using an aqueous washing medium.

2. Description of the Background Art

Fluorine-containing polymers are used widely in many fields of industry because of their excellent chemical resistance, low surface friction, flame-retardancy, and heat resistance.

Freon (trademark) has been commonly used as a major medium for washing various semi-conductor products. Because of environmental problems, however, the use of Freon in these areas has been replaced by super-purified water in recent years. For this reason, fluorine-containing polymer materials having superior water-repellency, such as polytetrafluoroethylene, tetrafluoroethylene-perfluoroalkyl vinyl ether copolymer, and tetrafluoroethylene-hexafluoropropylene copolymer, are used for various tools, jigs, parts, and equipment in semi-conductor manufacturing processes. The contact angle with water for these fluorine-containing polymers with water, indicative of the water-repellency of these materials, is as small as about 110°, which is insufficient for easy drainage of water. A drying step is thus required for water removal.

Water-repellency of solid surfaces of polymer materials is known to be greatly affected by surface roughness, provided that the chemical composition and the crystalline structure are the same (R. N. Wenzel, Ind. Eng. Chem., 28, 988 (1936)). Known as methods for increasing water-repellency of polymer surfaces are, for example, a method of dispersing a water-repellent filler in a polymer having perfluoroalkyl group as a matrix (F. Oishi, et al., Hyoumen (Surface), 28, 988 (1990)) and a method of performing eutectoid galvanization of a galvanizing solution in which particles of polytetrafluoroethylene oligomer are dispersed (Japanese Patent Application Laid-open (kokai) 285199/1992).

In these methods, however, the water-repellent filler or particles of polytetrafluoroethylene oligomer may be released from the matrix and give rise to decreased water-repellency.

One of the objects of the present invention is therefore to provide an article molded from fluorine-containing polymer, especially of polytetrafluoroethylene, with increased water-repellency.

As mentioned above, washing processes using an aqueous medium are more popular in semi-conductor and precision mechanical parts industries in the wake of promulgation of the restricted use of Freon. In these washing processes, a number of systems are employed for successively immersing parts to be washed, held by a jig such as a semi-conductor wafer washing carrier, in several vessels containing different types of aqueous washing mediums or water.

Polytetrafluoroethylene is known as a typical material used for molding jigs such as carriers employed in these processes. Since water is much less volatile than Freon, however, removal of the water from these tools or jigs made of polytetrafluoroethylene is insufficient. This causes problems such as the need for time-consuming and complex procedures for removing water attached to the washed parts after removing these parts from the washing vessels, which results in a reduction in productivity; and contamination of the washing media by the attached water in subsequent vessels, which gives rise to the necessity of frequent replacement of the washing media in these vessels. Water tends to remain especially in portions where the washed parts and the jig such as a carrier come in contact. Delayed removal of such remaining water is considered to impair the product quality depending on the applications of the product.

Methods conventionally used for avoiding these problems have been a method of extracting the washed products very slowly from the vessel while heating the washing liquid to vaporize the attached water over the liquid surface, or a method of removing water by a centrifuge. These methods are also time consuming and require complicated procedures and high cost.

It is therefore another object of the present invention to provide a jig made of polytetrafluoroethylene exhibiting greatly improved water-removing properties, carrying minimal water attached thereto, and remarkably improving the productivity, when used for holding parts to be washed in washing processes using an aqueous washing medium.

As a result of extensive studies in order to improve water-repellency of molded articles of fluorine-containing polymer, the present inventors have found that a molded article of fluorine-containing polymer with excellent water-repellency and superior durability can be obtained by treating the surface of such a molded article with fluorine gas after roughening the surface. The present inventors have further found that the water-repellency can be also increased in molded articles of fluorine-containing polymer, especially of polytetrafluoroethylene, when the articles are treated with heat at a temperature between the melting point and the decomposition temperature. Furthermore, the present inventors have found that these molded articles of fluorine-containing polymer, especially of polytetrafluoroethylene, are extremely useful as a jig for holding articles to be washed in washing processes using an aqueous washing medium in variety of fields. These findings have led to the completion of the present invention.

SUMMARY OF THE INVENTION

Accordingly, an object of the present invention is to provide a molded article of fluorine-containing polymer with increased water-repellency obtained by a treatment of the surface with a fluorine-containing gas after roughening of the surface.

In a preferred embodiment, the roughening of the surface of the molded article of fluorine-containing polymer is carried out by a mechanical treatment or an electrical treatment.

In another preferred embodiment, the treatment with a fluorine-containing gas is carried out under heating.

Among fluorine-containing polymers, polytetrafluoroethylene is especially suited for increasing the water-repellency by a treatment with heat. Therefore, it is another object of the present invention to provide a molded article of polytetrafluoroethylene with increased water-repellency obtained by a heat treatment at a temperature between the melting point and the decomposition temperature.

This object of increasing the water-repellency of a polytetrafluoroethylene molded article is more effectively achieved when the heat treatment is carried out in combination with the surface roughening and/or the treatment with the fluorine-containing gas.

Still another object of the present invention is to provide a jig made of polytetrafluoroethylene used in washing processes using an aqueous washing medium.

Other and further objects, features and advantages of the present invention will appear more fully from the following description.

DETAILED DESCRIPTION OF THE INVENTION AND PREFERRED EMBODIMENTS

There are no specific limitations as to the molded article to be treated with a fluorine-containing gas or with heat so long as such a molded article is made of a fluorine-containing polymer. Included in the fluorine-containing polymers which can be used in the present invention are polytetrafluoroethylene (PTFE), tetrafluoroethylene-perfluoroalkyl vinyl ether copolymer (PFA), tetrafluoroethylene-hexafluoropropylene copolymer (FEP), polychlorotrifluoroethylene (PCTFE), tetrafluoroethylene-ethylene copolymer (ETFE), chlorotrifluoroethylene-ethylene copolymer (ECTFE), polyvinylidene fluoride (PVdF), and polyvinyl fluoride (PVF).

Films, sheets, and various other molded articles of these fluorine-containing polymers made by any commonly known methods, such as the casting method, the melt extrusion method, injection molding, rote molding, blow molding, the calendar method, the elongation method, or press-molding, can be used. Addition of various vehicles, additives, and processing agents for manufacturing these molded articles is not restricted.

The water-repellency of these molded articles of fluorine-containing polymer can be increased by roughening the surface and treating the roughened surface with fluorine-containing gas. The roughening of the surface can be performed either by a mechanical treatment or by an electric treatment. Cutting operations such as wire brushing, belt sanding, shot blasting, and cutting work are given as the mechanical treatment; and sputtering by the low-temperature plasma method can be given as a typical example of the electric treatment for roughening the surface.

This roughening operation causes the molecular chains in the surface of the molded article of fluorine-containing polymer to be cut and makes the surface irregular. Although the extent of this irregularity cannot be generically specified, Ra, defined as the center line average roughness in JIS B 0601 (Definition and Designation of Surface Roughness), is 0.1–50 µm, preferably 0.2–15 µm, in the case of the mechanical treatment. If Ra is less than 0.1 µm, no molecular chains are cut by the mechanical treatment, resulting in an insufficient improvement in the water-repellency by the treatment with fluorine gas. If Ra is greater than 50 µm, water drops may be entrapped by recessed points on the surface, also giving rise to an insufficient increase in the water-repellency. The electric treatment, on the other hand, causes the molecular chain to be cut even at small irregularities on the surface, so that Ra of greater than 0.1 µm, preferably of 0.2–2.0 µm, may be appropriate. If Ra is less than 0.1 µm, no improvement in the water-repellency can be achieved by the fluorine gas treatment. It is difficult to obtain Ra of greater than 3.0 µm by the electric treatment.

The molecular chain cut in a molded article of a fluorine-containing polymer with a high melting point, such as polytetrafluoroethylene, can be easily achieved by the mechanical treatment using a wire wheel brush or a belt sander. In the case of a fluorine-containing polymer with a low melting point, such as polytetrafluoroethylene-ethylene copolymer, the use of shot blasting is preferred. The treatment with a wire wheel brush may melt the surface due to the heat of friction.

The surface of a molded article of fluorine-containing polymer after the roughening operation is then treated with fluorine gas or a mixture of fluorine gas and an inert gas, such as nitrogen or argon, with the concentration of the inert gas being preferably 10–90% (hereinafter collectively referred to as fluorine gas). The temperature at which the molded article of fluorine-containing polymer is treated with the fluorine gas varies depending on the types of fluorine-containing polymer. Generally, a temperature in the range of 100°–300° C., especially 150°–250° C., is preferred. There are close relationships between the concentration of fluorine gas and the treating time. If the concentration is high, the time for the fluorine gas treatment may be short; if the concentration is low, a longer time is required for the treatment. Also, if the quantity of the molded articles of fluorine-containing polymer filled in a container where they are treated with fluorine gas is small, the concentration of the fluorine gas may be low. If this filled quantity is large, the treatment must be achieved with a high concentration fluorine gas or requires a longer period of time. A preferable concentration of fluorine gas is 10–500 torr, when the treatment time is ten minutes to one hour.

This surface treatment with fluorine gas of the molded article of fluorine-containing polymer after roughening can be carried out by placing the molded article in an air-tight container, removing the air from the container, and introducing fluorine gas or a mixed gas containing an inert gas and fluorine gas to the container.

As mentioned above, roughening of the surface of the molded articles of fluorine-containing polymer induces irregularities on the surface and cutting of the molecular chains, thus causing unstable terminal groups to be produced. These unstable terminal groups are considered to be different from the terminal groups produced by the polymerization; they are considered to be peroxy radicals, which are formed by the reaction of radicals produced by the mechanical or electrical treatment and oxygen in the air.

Figure 1:
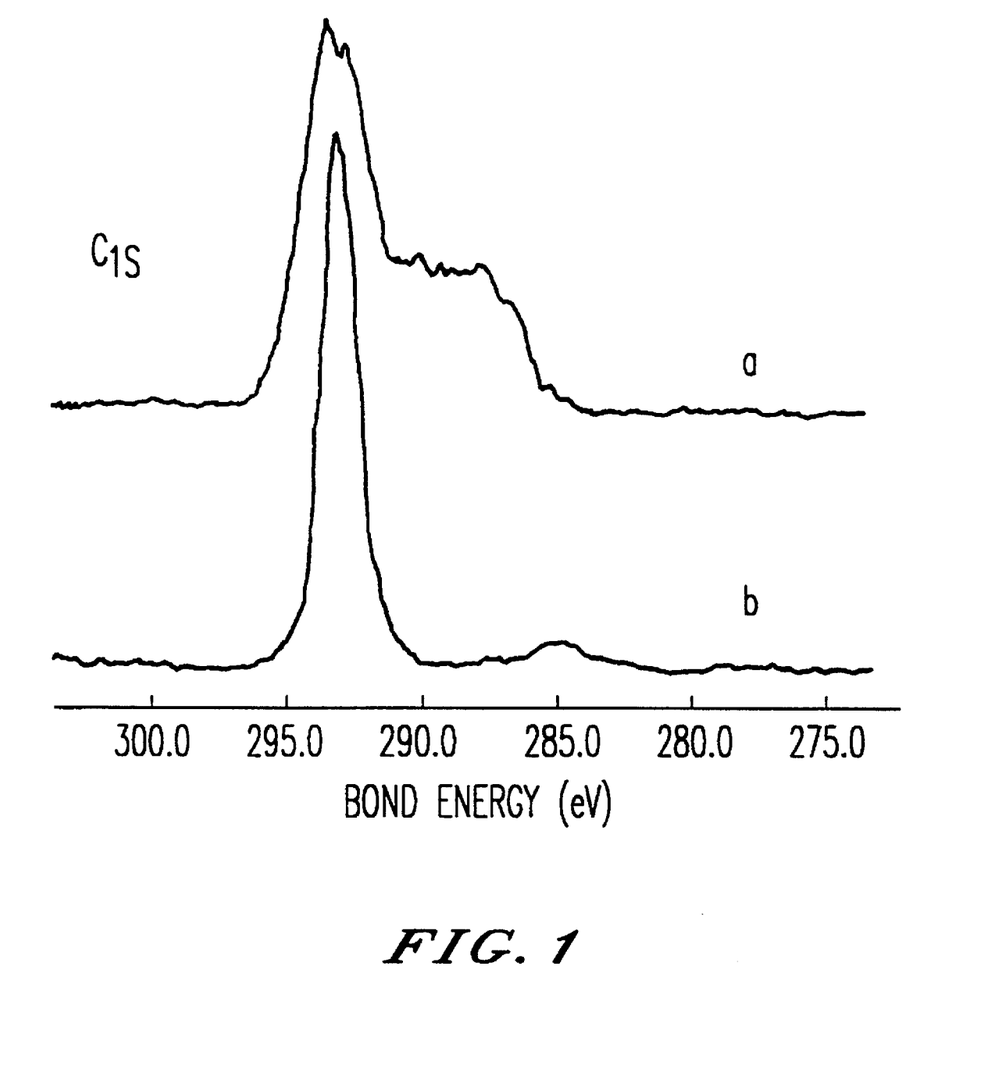
FIG. 1 shows $C_{1S}$ spectra measured by X-ray photoelectron spectroscopy (ESCA) of a polytetrafluoroethylene sheet with the surface having been roughened with a wire-wheel brush, (a) before the treatment with fluorine gas and (b) after the treatment with fluorine gas.
Figure 2:
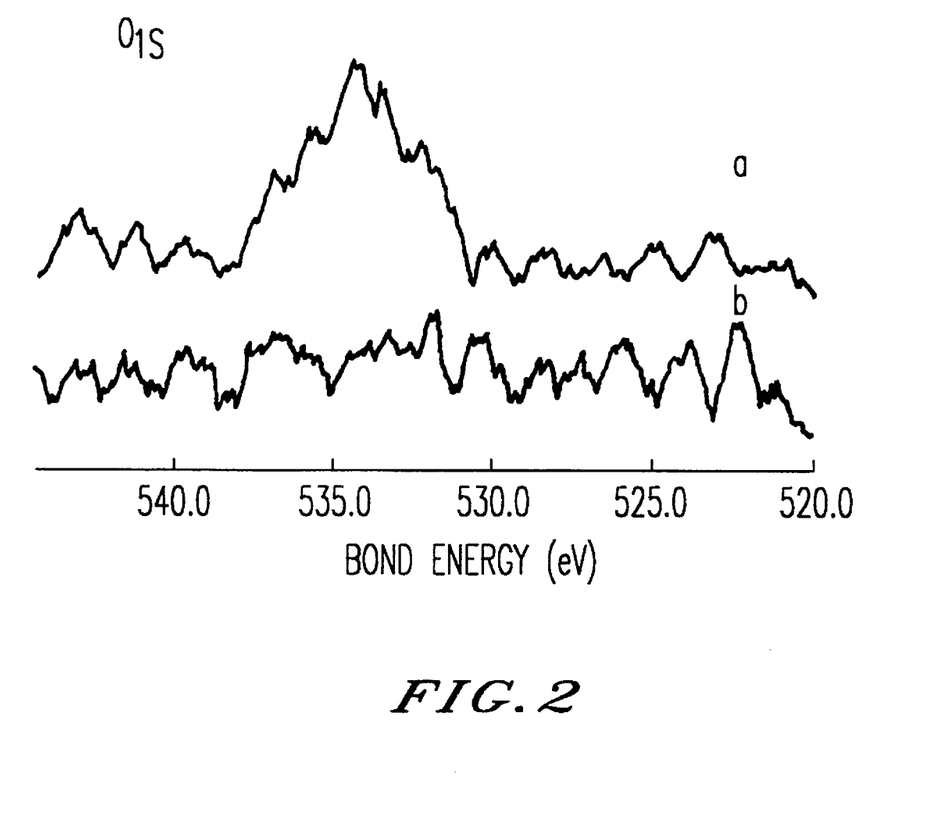
FIG. 2 shows $O_{1S}$ spectra of a polytetrafluoroethylene sheet with the surface having been roughened with a wire-wheel brush, (a) before the treatment with fluorine gas and (b) after the treatment with fluorine gas.

In FIG. 1, curve (a) shows a $C_{1S}$ spectrum measured by X-ray photoelectron spectroscopy (ESCA) of a polytetrafluoroethylene sheet without treatment with fluorine gas after the surface has been roughened with a wire-wheel brush, and curve (b) is a similar curve obtained with the fluorine gas treatment after the surface roughening. FIG. 2 is $O_{1S}$ spectra corresponding to curves (a) and (b) for $C_{1S}$ spectra in FIG. 1.

The $C_{1S}$ spectrum for both curves (a) and (b) in FIG. 1 has a peak for the group —$CF_2$— at 293.3 eV. The $C_{1S}$ spectrum curve (a) has another peak at 288.9 eV on the lower energy side, while the $O_{1S}$ spectrum curve (a) has a peak at 535 eV, suggesting formation of peroxy radicals. The peroxy radicals are converted to —$CF_3$ group by the fluorine gas treatment. This is evidenced by the fact that curve (b) in FIG. 1 has no peak at 288.9 eV and curve (b) in FIG. 2 has no peak at 535 eV.

Because of the irregularities produced by cutting the molecular chain by the roughening operation, it is more difficult for a liquid to adhere to the surface of the molded articles of fluorine-containing polymer. In addition, the terminal groups formed by the roughening operation are considered to have been fluorinated by the treatment with fluorine gas into —$CF_3$ group which has a surface energy lower than —$CF_2$— group. These are considered to synergistically act to bring about increased water-repellency of the surface. Furthermore, roughening of the surface to produce minute irregularities enables the material to be extremely durable as compared to the surface rendered water-repellent by dispersing a water-repellent filler in the matrix.

The contact angle of the molded articles of fluorine-containing polymer obtained by the present invention is greater than the conventionally known contact angle of polytetrafluoroethylene, and the maximum value is as large as 155°. This contact angle remains the same even under the load imposed by friction, maintaining the high water-repellency for a long period of time. The molded articles of fluorine-containing polymer obtained by the present invention thus can be suitably directed to various applications in which these properties are required.

Among fluorine-containing polymers, polytetrafluoroethylene possesses an extremely high melt viscosity of about $10^{11}$ poise at a temperature above the melting point. Molded articles of polytetrafluoroethylene therefore can retain their shape even through they are heated to a temperature above the melting point. According to the present invention, a molded article of polytetrafluoroethylene can be provided with improved water-repellency by heating it to a temperature higher than the melting point and lower than the decomposition temperature of the polytetrafluoroethylene.

The molded articles of polytetrafluoroethylene which can be used here are those prepared by pre-molding powdery polytetrafluoroethylene, calcinating this material by the free baking method or the hot molding method, and mechanically processing the calcined products. These include films, sheets, and any other molded articles of various shapes. Addition of various vehicles, additives, and processing agents for manufacturing these molded articles is not restricted.

The molded articles of polytetrafluoroethylene thus prepared are then treated with heat at a temperature above the melting point and below the decomposition temperature of polytetrafluoroethylene. The temperature above the melting point and below the decomposition temperature of polytetrafluoroethylene is 327°–399° C. under atmospheric pressure. The water-repellency cannot be improved by the heat treatment below the melting point of polytetrafluoroethylene, because the surface of the polytetrafluoroethylene molded article does not melt at all at such low temperatures. Heating above the decomposition temperature, on the other hand, causes the polytetrafluoroethylene to decompose. A preferable treating temperature is between 340° C. to 380° C.

The period of time for which the polytetrafluoroethylene molded articles are treated with heat varies depending on the sizes and thicknesses. Small and thin molded articles require only a short period of time, while the heating time must be long for large and thick molded articles.

This heat treatment produces minute spheres of polytetrafluoroethylene with a diameter of about several microns on the surface of the molded articles. The size of the minute spheres may be in the range of 0.5–5.0 μm, although this cannot be generically specified. These minute spheres cause irregularities of approximately several microns to be produced on the surface of the molded articles of polytetrafluoroethylene. The irregularities are considered to contribute to the improvement in the water-repellency of the surface of the polytetrafluoroethylene. If tools, jigs, or the like are in contact with the surface while it is treated with heat, no spheres are produced at the point of contact, so that no improvement is exhibited in the water-repellency. For this reason, no tools, jigs, or the like should be in contact with the molded articles of polytetrafluoroethylene when they are treated with heat for improvement in water-repellency. For example, no improvement in water-repellency can be exhibited by a polytetrafluoroethylene sheet held in contact between metal plates after the treatment with heat at 350° C. The contact angle of the surface remains as small as 110°, which is equivalent to that inherently possessed by polytetrafluoroethylene.

Although the water-repellency of a polytetrafluoroethylene molded article can be improved by merely treating the surface with heat in this manner, a more effective way is to apply the heat treatment in combination with the aforementioned treatment with the fluorine-containing gas. The method and conditions of the treatment with the fluorine-containing gas illustrated above apply to this treatment in combination with the heat treatment.

Although it is possible to carry out the heat treatment after the molded article of polytetrafluoroethylene has been first treated with a fluorine-containing gas, an easier and more economical way is to carry out both treatments concurrently.

Moreover, the water-repellency of the polytetrafluoroethylene molded articles can be increased even more, if the surface is first roughened by the aforementioned mechanical means, and then treated with heat, optionally in combination with the treatment with fluorine-containing gas.

It would be expected that the roughening operation can be carried out first followed by the heat treatment. However, in actual fact, in this instance, irregularities produced by the roughening operation are broken down by the heat treatment that follows, so that no improvement in the water-repellency is obtained.

Furthermore, if the treatment with fluorine gas is first carried out, followed by the surface roughening treatment, no effect of the present invention, i.e., the effect of fluorinating the terminal groups produced by cutting molecular chains of polytetrafluoroethylene by the surface roughening, can be obtained. Thus, no improvement in the water-repellency can be achieved by the treatments of this order.

As mentioned above, the heat treatment of the polytetrafluoroethylene molded article produces minute irregularities of about several microns on the surface. These minute irregularities make the area in which liquid adheres to the polytetrafluoroethylene surface small, and are thus considered to increase the water-repellency.

Implementing this heat treatment, which produces irregularities on the surface, in combination with the treatment with fluorine gas causes the polytetrafluoroethylene terminal groups to be fluorinated into —$CF_3$ which possesses a lower surface energy, thereby greatly improving the water-repellency.

Furthermore, if the surface of the polytetrafluoroethylene molded article is roughened in advance by a mechanical means to increase terminal groups on the surface and produce irregularities, the heat treatment which follows the roughening operation produces more minute and a greater number of irregularities, which contribute to an even higher degree of water-repellency. This surface, if further treated with fluorine gas, can exhibit superior water-repellency, which has not previously been seen in any known materials.

According to the present invention, the contact angle of polytetrafluoroethylene to water can be increased to as large as 168°, which greatly exceeds the conventionally known contact angle of polytetrafluoroethylene. The molded articles of polytetrafluoroethylene obtained in this way can be suitably used in various fields in which this excellent water-repellency is required.

One of the particularly preferred applications of polytetrafluoroethylene molded articles having superior water-repellency is a tool or a jig for holding parts to be washed in a washing process using an aqueous medium.

Tools or jigs for holding parts can be manufactured by molding polytetrafluoroethylene in any desired shape. There are no specific limitations as to the molding method. Various known plastic processing techniques can be suitably combined according to the purposes for which they are used. Molded articles manufactured by compress molding into a bar or a plate, treated with heat, and finished by a cutting operation, followed by surface toughening, are especially preferred in view of the excellent water drainage properties.

The molded article of polytetrafluoroethylene with a desired shape thus obtained is then treated with fluorine gas.

The aforementioned methods of fluorine gas treatment can be applied without critical limitations. One example of these methods comprises, first, placing the molded articles in a chamber made of metal, setting the treatment temperature, introducing fluorine gas with a concentration in a specified range into the chamber, holding the articles for a specified period of time, replacing the fluorine gas with air, and then removing the treated molded articles from the chamber.

A temperature between ordinary temperatures and 250° C. is preferred for the treatment. A temperature below ordinary temperatures not desirable, because the treatment takes a longer time and the resulting water-drainage properties are also poor. It is also not desirable to effect the treatment above 250° C., because thermal deformation of the polytetrafluoroethylene molded articles tends to take place at a high temperature and the dimensional accuracy of the product is reduced. A particularly preferred temperature is between 150° C. and 220° C.

Because the fluorine gas concentration is related to the treating temperature, it is desirable to select the fluorine gas concentration taking the treating time corresponding to the capacity of the chamber being used into consideration. Namely, when the treating temperature is low, a higher fluorine gas concentration is required (the treating time becomes relatively longer), and when the treating temperature is high, a low fluorine-containing gas concentration is required (the treating time becomes relatively shorter). Taking the above-described treating temperature into consideration, it is desirable to have a fluorine gas concentration in the range of 10 to 200 torr, and preferably in the range of 50 to 150 torr.

The jigs made of polytetrafluoroethylene used in washing processes using an aqueous medium according to the present invention include, for example, carriers for washing semiconductor wafers, carriers for washing glass plates of a liquid crystal display device, or guide rolls for washing the glass plates of the liquid crystal display device.

Other features of the invention will become apparent in the course of the following description of the exemplary embodiments which are given for illustration of the invention and are not intended to be limiting thereof.

EXAMPLES

Example 1

Figure 3:
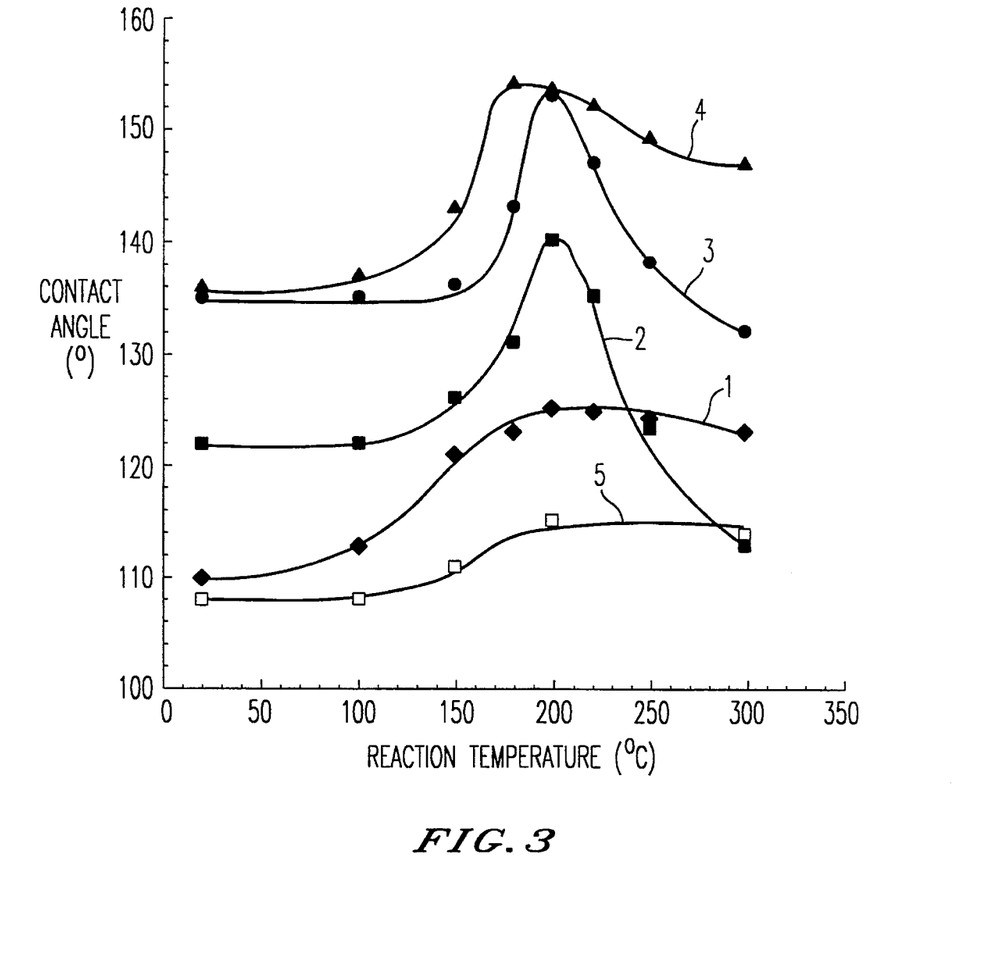
FIG. 3 is a drawing showing curves for contact angles of surfaces of polytetrafluoroethylene sheets treated with fluorine gas at different temperatures, after the surfaces have been roughened by shot-blasting (curve 1), the low-temperature plasma method (curve 2), a wire-wheel brush (curve 3), or a belt sander (curve 4), or without any surface roughening (curve 5).

Surfaces of polytetrafluoroethylene (PTFE) sheets were roughened by the surface roughening methods 1, 2, 3, and 4, defined below. The roughness of each sheet was measured according to JIS B 0601 using a surface roughness shape measurement device, Surcom 300B (trademark. manufactured by Tokyo Seimitsu Co.). As a result, the sheets roughened by methods 1, 2, 3, and 4 were found to have Ras of 5.6 μm, 0.3 μm, 7.7 μm, and 3.1 μm, respectively. Sheets were cut into 1×3 rectangles and placed in a cylindrical nickel vessel having an external diameter of 2" and a length of 600 mm. The pressure inside the vessel was reduced to 0.2 torr, then fluorine gas was introduced until a pressure of 100 torr was reached. The sheets were then treated with heat for 10 minutes, during which the temperature was varied by external heating. After the treatment, the fluorine gas was discharged and atmospheric pressure was again reached by introducing nitrogen gas, and the treated sheets were removed. The degree of water-repellency was evaluated by measurement of the contact angles. The results are shown in FIG. 3, in which curve (5) represents the results on a sheet for which the surface was not roughened, having an Ra of 0.09 μm.

(Surface roughening method)

1. The surface of a PTFE sheet (200×200×0.5 mm) was roughened using a shot blast machine (manufactured by Japan Blast Machine Co.) and #30 iron powder at an injection air pressure of 3 kg/cm$^2$, following which the surface was washed with a strong acid to remove iron powder remaining thereon.

2. A PTFE sheet (100×100×0.5 mm) was placed in a plasma generator. The pressure inside the plasma generator was reduced to $10^{-4}$ torr, then argon gas was introduced. The PTFE sheet was then treated by low temperature plasma generated by high-frequency electric power of 13.5 MHz and 400 W for 50 seconds, while a pressure of 0.03 torr was maintained under an argon gas stream.

3. A PTFE sheet (100×100×0.5 mm) was roughened using a stainless steel (SUS 304) wire wheel brush both laterally and longitudinally at a rotation of 2000 rpm, while the brush was fixed by pressing the tips to the sheet to a depth of 1 mm.

4. The surface of a PTFE sheet (100×100×0.5 mm) was roughened using a belt sander, M648 (trademark, manufactured by Kikukawa Steel Co.), in which a #240 belt was used.

(Measurement of contact angle)

Contact angles were measured by a contact angle measurement device, CA-S150 (trademark, manufactured by Kyowa Kaimen Kagaku Co.). Drops of distilled water with a uniform diameter of 1 mm produced using a microhead of a microsyringe were dropped onto the surface of the samples, while the equilibrium contact angles were read. The contact angle of each sample was determined by averaging the results of 10 measurements.

(Results)

The results are shown in FIG. 3, by which the following facts are demonstrated.

(1) All sheets of which the surfaces were roughened by any one of methods 1–4 resulted in larger contact angles by the treatment with fluorine gas at 20°–300° C., as compared with the sheet 5, of which the surface was not roughened. The contact angle becomes larger in the order of methods 1, 2, 3, and 4.

(2) The sheet 5, of which the surface was not roughened, exhibited only a slight increase in the contact angle, while there was a tendency for the contact angles for the sheets, of which the surfaces were roughened by any one of methods 1–4, to exhibit little change from 20° C. to about 100° C., increase from about 100° C., exhibit a peak around 200° C., and then decrease at higher temperatures.

This indicates that the contact angle is large for samples treated with fluorine gas after the surface roughening, demonstrating increased water-repellency.

Examples 2–3, Comparative Examples 1–2

Surfaces of sheets of tetrafluoroethyleneperfluoroalkyl vinyl ether copolymer (PFA) and tetrafluoroethylene-ethylene copolymer (ETFE), both having a size of 200×200×0.5 mm, were roughened by the method 1 in Example 1. Rectangular samples of the same size as those in Example 1 were then treated with fluorine gas, using the same equipment as used in Example 1 at 200° C. and a fluorine gas concentration of 400 torr for 60 minutes. The results are shown in Table 1.

As comparative Examples, sheets of PFA and ETFE with no roughening of the surface were treated with fluorine gas under the same conditions. The results are also shown in Table 1.

As can be seen in Table 1, the sheets without roughening of the surface exhibited only a slight increase in the contact angle, whereas those for which the surface was roughened had contact angles larger than the PTFE sheet treated by the method 1 in Example 1.

TABLE 1

|  | Example 2 | Example 3 | Comparative Example 1 | Comparative Example 2 |
| --- | --- | --- | --- | --- |
| Fluorine-containing polymer | PFA | ETFE | PFA | ETFE |
| Contact angle before surface roughening (°) | 108 | 91 | 108 | 91 |
| Contact angle after surface roughening (°) | 122 | 110 | — | — |
| Contact angle after fluorine gas treatment (°) | 142 | 146 | 117 | 117 |
| Ra (μm) | 3.4 | 2.8 | 0.04 | 0.02 |

Example 4

(Durability test)

The surface of a PTFE sheet was roughened by the method 3 described in Example 1 and treated with fluorine gas using the same equipment as used in Example 1 at 200° C. and a fluorine gas concentration of 100 torr for 10 minutes. This sheet was then subjected to a friction test, in which the sheet was wiped for 500 strokes by a automobile windshield wiper. The contact angle was then measured and found to be 149°. Tap water at a flow rate of 1 l/min was continuously applied for 24 hours to another sample of the sheet treated in the same manner as above. The contact angle was measured and found to be 150°, indicating there was almost no change in the contact angle after the 24-hour tap water application test.

Example 5

Figure 4:
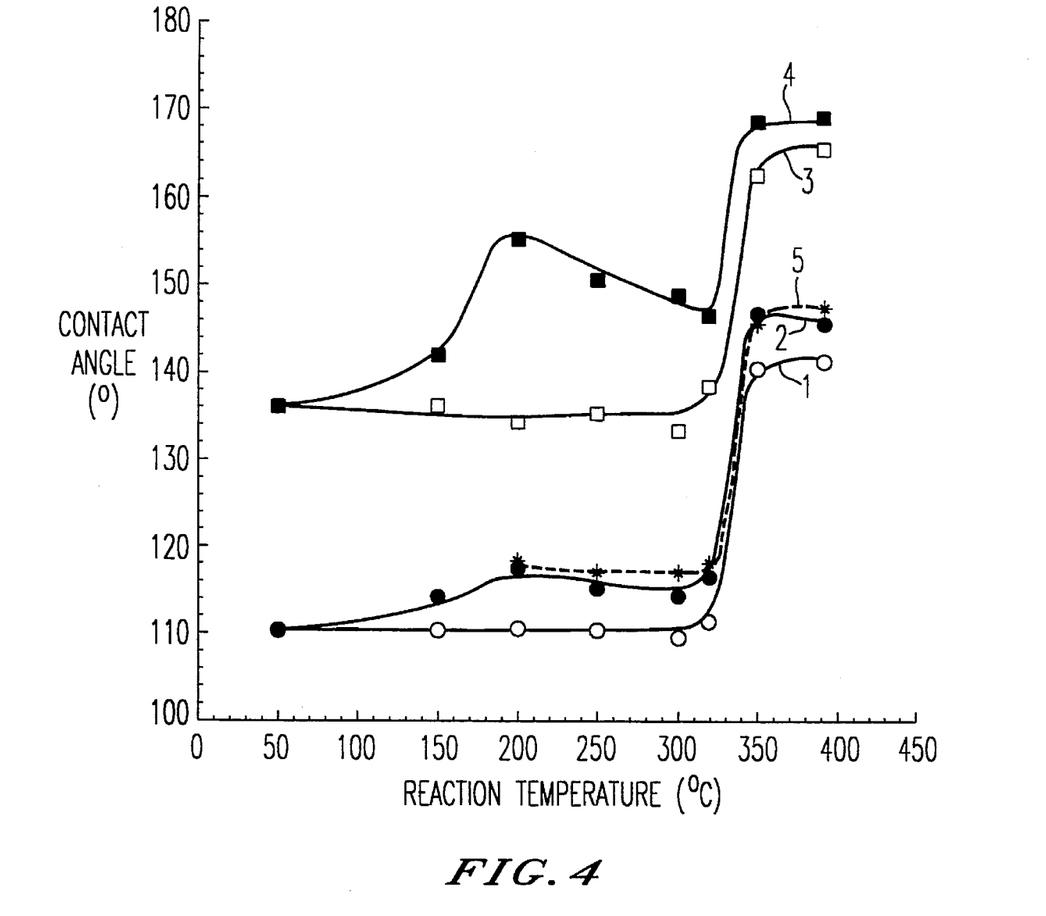
FIG. 4 is a drawing showing curves for contact angles obtained when polytetrafluoroethylene sheets were treated under various conditions at different temperatures in Example 5, wherein curve 1 is the case where the sheet was treated simply with heat; curve 2, treated with fluorine gas while heating; curve 3, treated with heat after the surface was roughened; curve 4, treated with fluorine gas while heating after the surface was roughened; and curve 5, first treated with fluorine gas and then treated with heat.

PTFE sheets (40×50×1 mm) were treated by the method 1–5 described below. The sheets were placed in a cylindrical nickel vessel having a diameter of 55 mm and a length of 600 mm and treated with heat at various temperatures by heating the vessel from outside, followed by cooling at a rate of 100° C. per hour to room temperature. The degree of water-repellency was evaluated by measurement of the contact angles according to the same method as in Example 1. The results are shown in FIG. 4.

(Treatment method)

1. A PTFE sheet was treated with heat for 10 minutes at different temperatures.

2. A PTFE sheet was heated for 10 minutes at different temperatures, while treating with fluorine gas at 100 torr.

3. The surface of a PTFE sheet was roughened using a belt sander, M648 (trademark, manufactured by Kikukawa Steel Co.), with a #240 belt. The roughness of the sheets was measured according to JIS B 0601 using a surface roughness shape measurement device, Surcom 300B (trademark.

manufactured by Tokyo Seimitsu Co.) and Ra was found to be 3.2 μm.

4. A PTFE sheet, of which the surface was roughened by the above method 3, was heated for 10 minutes at different temperatures, while treating with fluorine gas at 100 torr.

5. A PTFE sheet was treated with fluorine gas at 100 torr for 10 minutes at a temperature of 200° C., followed by treatment with heat at different temperatures.

(Results)

The results are shown in FIG. 4.

As clear from FIG. 4, in the sheet treated by the method 1 there was almost no change in contact angle up to 320° C., but the contact angle sharply increased at 340° C.

The sheet treated by the method 2 exhibited a contact angle increase as much as about 5° at 200° C. Then, there was almost no change in the contact angle up to 320° C., but the contact angle sharply increased at 340° C.

In the sheet treated by the method 3, in which both the surface roughening and the heat treatment was carried out together, in the same way as in the sheet treated by method 1, there was almost no change in contact angle up to 320° C., but the contact angle sharply increased at 340° C.

The sheet treated by the method 4, in which the heat treatment was carried out together with the treatment with fluorine gas, showed an increase in the contact angle to as much as 155° at 200° C. At 320° C., the contact angle decreased about 10°. However, the treatment at 340° C. resulted in an increase in the contact angle to the highest value of 168°, exceeding the contact angle reached at 200° C.

TABLE 2

|  | Treating temperature (°C.) | Fluorine gas concentration (torr) | Time (min) |
| --- | --- | --- | --- |
| Example 6 | Room temperature (25° C.) | 100 | 30 |
| Example 7 | 100 | 100 | 30 |
| Example 8 | 200 | 100 | 30 |

A water drainage test was carried out, using three guide roll replicas as shown in Examples 6–8 and a guide roll replica (Comparative Example) without the fluorine gas treatment, as test samples. Each test sample was weighed by suspending by an electronic balance to determine the weight in its original condition. A glass reservoir filled with distilled water was placed below the suspended samples. The glass reservoir was then gradually raised at a speed of about 5 cm/sec until all samples were immersed to full submersion in the water. Five minutes later, the glass reservoir was lowered at a speed of about 5 cm/sec to remove the samples completely from the reservoir, and the samples were again weighed. This operation was repeated five times and the difference between the weight of the sample after immersion and the original weight (the number times of immersion: 0) was taken as an amount (g) of water attached to the sample. The measuring conditions were at a water temperature of 22° C., room temperature of 24° C., and a humidity of 45°. The results are shown in the following Table 3.

TABLE 3

|  | Example 6 | | Example 7 | | Example 8 | | Comparative Example 3 | |
| --- | --- | --- | --- | --- | --- | --- | --- | --- |
| Number of immersions | Measured weight | Attached water | Measured weight | Attached water | Measured weight | Attached water | Measured weight | Attached water |
| 0 | 205.20 | — | 205.21 | — | 205.27 | — | 205.25 | — |
| 1 | 205.82 | 0.62 | 205.62 | 0.41 | 205.44 | 0.17 | 206.82 | 1.57 |
| 2 | 205.85 | 0.65 | 205.56 | 0.35 | 205.47 | 0.20 | 206.49 | 1.24 |
| 3 | 205.78 | 0.58 | 205.63 | 0.42 | 205.47 | 0.20 | 206.68 | 1.43 |
| 4 | 205.80 | 0.60 | 205.65 | 0.44 | 205.46 | 0.19 | 206.49 | 1.24 |
| 5 | 206.08 | 0.88 | 205.55 | 0.34 | 205.46 | 0.19 | 206.73 | 1.48 |

Sheet 5 treated by the method 5, in which the heat treatment was carried out following the treatment with fluorine gas, showed the same tendency in the contact angle values as in the sheet treated by the method 1.

These results indicate that the treatment with heat at a temperature of 340°–399° C. brings about a sharp increase in the contact angle. If the heat treatment is carried out together with the fluorine gas treatment, a larger contact angle can be obtained. If a molded article of PTFE of which the surface was roughened in advance is used, the highest contact angle, which indicates superior water-repellency, can be achieved.

Examples 6–8, Comparative Example 3

Figure 5:
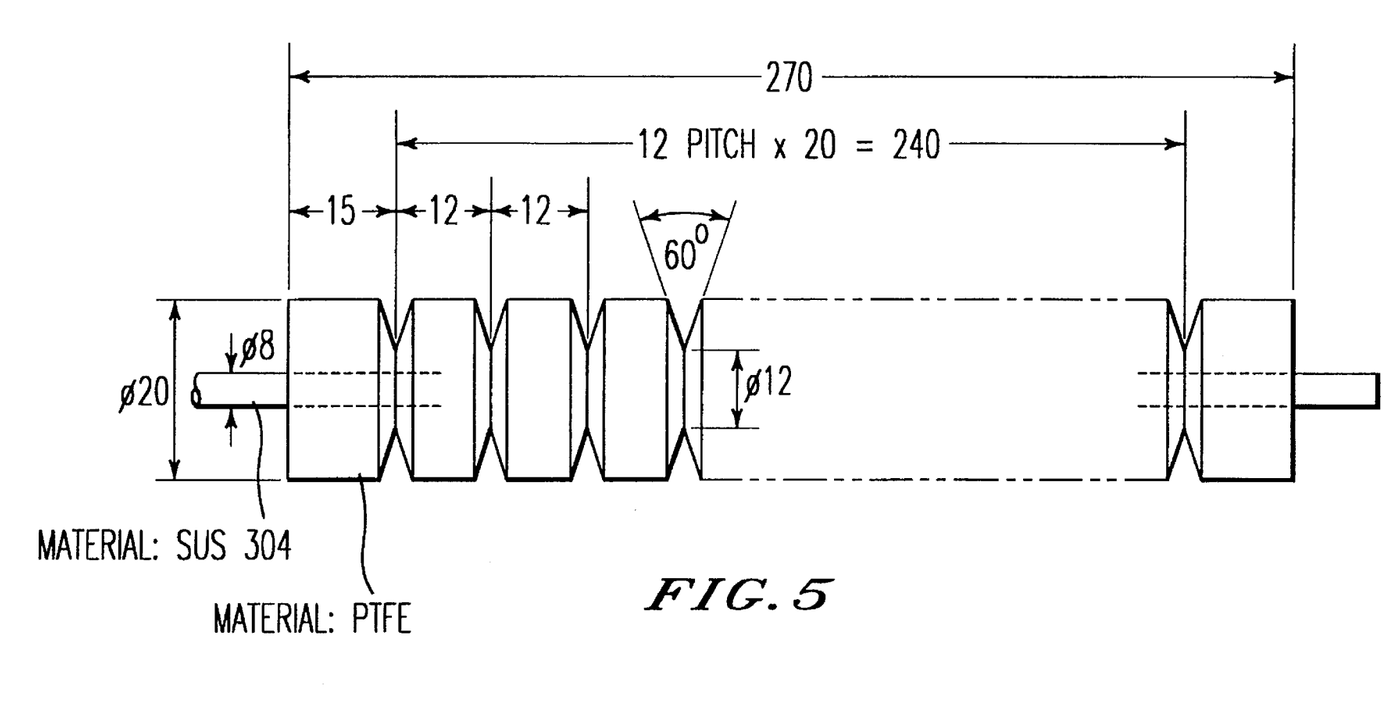
FIG. 5 is a front view of a prototype guide roll for washing crystal display glass plates, used in a test for confirming water removal properties of the molded article with improved water-repellency of the present invention.

Roll-shaped polytetrafluoroethylene molded articles were provided with a reinforcing SUS material and cut to a bead-and-reel shape. Thus, as shown in FIG. 5, a guide roll replica (20×270 mm) for washing glass plates for a liquid crystal display device was manufactured. Then, a fluorine gas treatment was applied to the guide roll replica under the conditions shown in the following Table 2.

As clear from Table 3, the amount of water attached to each of the samples of Examples 6–8 was only ½ to ⅐ of that attached to the sample of Comparative Example 3, showing the excellent water-drainage properties of the molded articles of the present invention.

Obviously, numerous modifications and variations of the present invention are possible in light of the above teachings. It is therefore to be understood that within the scope of the appended claims, the invention may be practiced otherwise than as specifically described herein.

What is claimed is:

1. A method for preparing a molded article of fluorine-containing polymer having increased water-repellency, which comprises:

(a) roughening a surface of said molded article with a shot blast to an irregularity of 0.1 to 50 μm; and (b) contacting the roughened surface with fluorine gas at a temperature of about 100° C. to 300° C., using a concentration of said fluorine gas of about 10 to 500 torr, with a treatment time of from about 10 minutes to one hour.

2. The method of claim 1, wherein said fluorine-containing polymer is selected from the group consisting of polytetrafluoroethylene, tetrafluoroethylenepolytetrafluoroethylene, tetrafluoroethylene-perfluoroalkyl vinyl ether copolymers, tetrafluoroethylenehexafluoropropylene copolymer, polychlorotrifluoroethylene, tetrafluoroethylene-ethylene copolymer, chlorotrifluoroethylene-ethylene copolymers, polyvinylidene fluoride and polyvinyl fluoride.

3. The method of claim 1, wherein said irregularity is from 0.2 to 15 µm.

4. The method of claim 1, wherein said fluorine-containing polymer is polytetrafluoroethylene.

* * * * *